US012629811B2

(12) United States Patent
Xu et al.

(10) Patent No.: US 12,629,811 B2
(45) Date of Patent: May 19, 2026

(54) POWER TOOL

(71) Applicant: Nanjing Chervon Industry Co., Ltd., Nanjing (CN)

(72) Inventors: Zhongquan Xu, Nanjing (CN); Xiangqing Fu, Nanjing (CN); Yang Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/937,830

(22) Filed: Nov. 5, 2024

(65) Prior Publication Data

US 2025/0058448 A1 Feb. 20, 2025

Related U.S. Application Data

(63) Continuation of application No. PCT/CN2023/093150, filed on May 10, 2023.

(30) Foreign Application Priority Data

Jun. 10, 2022 (CN) ......................... 202210649700.8
Apr. 21, 2023 (CN) ......................... 202310443426.3
Apr. 21, 2023 (CN) ......................... 202320919154.5

(51) Int. Cl.
*B25F 5/00* (2006.01)
*B25F 3/00* (2006.01)

(52) U.S. Cl.
CPC . *B25F 5/00* (2013.01); *B25F 3/00* (2013.01)

(58) Field of Classification Search
CPC ............... B25F 5/00; B25F 5/001; B25F 3/00
See application file for complete search history.

(56) References Cited

U.S. PATENT DOCUMENTS 6,140,054 A 10/2000 Wittwer
2009/0136940 A1 5/2009 Bogdanov
2012/0292864 A1* 11/2012 Zhou ......................... B25F 5/00 279/141
2015/0034353 A1* 2/2015 Huo ....................... H02K 7/075 173/217
2016/0271711 A1* 9/2016 Qian ....................... B25F 5/001
2018/0335118 A1* 11/2018 Gu .......................... B25F 5/001

FOREIGN PATENT DOCUMENTS

CN 113710686 A 11/2021
CN 115414703 A 1/2023
CN 112533998 A 6/2023

OTHER PUBLICATIONS

International Search Report of application No. PCT/CN23/93150, dated May 10, 2024, 10 pp.

* cited by examiner

*Primary Examiner* — Michelle Lopez
(74) *Attorney, Agent, or Firm* — Greenberg Traurig, LLP

(57) ABSTRACT

A power tool includes a transmission assembly configured to transmit power between a motor and an output assembly to drive an output shaft to oscillate back and forth; and an adjustment assembly for adjusting the transmission assembly. The adjustment assembly is configured to, when a load of the output shaft satisfies a preset value of the adjustment assembly, control the transmission assembly according to the load of the output shaft so that the transmission assembly adjusts an angle of oscillation of a work attachment.

16 Claims, 8 Drawing Sheets

POWER TOOL

RELATED APPLICATION INFORMATION

This application is a continuation of International Application Number PCT/CN2023/093150, filed on May 10, 2023, through which this application also claims the benefit under 35 U.S.C. § 119(a) of Chinese Patent Application No. 202210649700.8 filed on Jun. 10, 2022, Chinese Patent Application No. 202310443426.3 filed on Apr. 21, 2023, and Chinese Patent Application No. 202320919154.5 filed on Apr. 21, 2023, the disclosures of which are incorporated herein by reference in their entireties.

TECHNICAL FIELD

The present application relates to a power tool, for example, an oscillating power tool.

BACKGROUND

As a power tool, an oscillating multi-tool generally drives the oscillation of a work attachment through an oscillating member to perform cutting, grinding, and other operations on an object.

In recent years, the angle of oscillation of the oscillating multi-tool has a tendency to increase. In the related art, the angle of oscillation of the tool has increased from ±1.4° to ±1.8°, ±2.0°, and even ±2.5°. The angle of oscillation is increased so that operation efficiency can be improved. When a machined material is relatively easy to cut, a relatively small angle of oscillation can improve the machining fineness.

SUMMARY

The present application provides a power tool that can automatically adapt to different working conditions.

An example of the present application provides a power tool including a motor including a drive shaft rotating around a first axis; an output assembly including an output shaft centered around an output axis; a work attachment driven by the output shaft to oscillate back and forth; a transmission assembly configured to transmit power between the motor and the output assembly to drive the output shaft to oscillate back and forth; and an adjustment assembly for adjusting the transmission assembly. The adjustment assembly is configured to, when a load of the output shaft satisfies a preset value of the adjustment assembly, control the transmission assembly according to the load of the output shaft so that the transmission assembly adjusts an angle of oscillation of the work attachment.

In some examples, the transmission assembly includes a first bearing for supporting the drive shaft, a shift fork for supporting the output shaft, a second bearing for driving the shift fork to oscillate back and forth, and an eccentric member including a central portion connected to the first bearing and an eccentric portion connected to the second bearing.

In some examples, an axis of the eccentric portion is eccentric relative to an axis of the central portion.

In some examples, the transmission assembly is configured with different working modes, and when the transmission assembly is in the different working modes, the output shaft drives the work attachment to oscillate back and forth at different angles.

In some examples, when the transmission assembly switches between the different working modes, the axis of the eccentric portion has different eccentric distances from the first axis.

In some examples, the first bearing includes a central hole connected to the drive shaft and a first eccentric hole with an eccentric distance from the central hole, the center line of the first eccentric hole is a second axis, and the central portion of the eccentric member is connected to the first eccentric hole.

In some examples, when the transmission assembly switches between the working modes, the second bearing drives the eccentric member to oscillate back and forth at a specified stroke around the second axis.

In some examples, the adjustment assembly includes a first biasing element, and the first biasing element supports the eccentric member and applies a biasing force to the eccentric member to bias the eccentric member towards the drive shaft.

In some examples, when the output shaft is subjected to the load, the eccentric member applies first pressure for moving away from the drive shaft to the first biasing element.

In some examples, when the first pressure is greater than the biasing force, the eccentric member moves away from the drive shaft.

In some examples, the second bearing is slidably connected to the eccentric portion along an axis of the eccentric portion, and the second bearing slides back and forth relative to the output shaft along the axis of the eccentric portion at a specified stroke.

In some examples, the axis of the eccentric portion has a constant eccentric distance from the first axis.

In some examples, the shift fork includes a first support portion connected to the second bearing, and the first support portion extends along the first axis.

In some examples, when the transmission assembly adjusts the angle of oscillation of the work attachment, the second bearing is driven to mate with different positions of the first support portion.

In some examples, an angle is set between an axis of the eccentric portion and the first axis, and the angle is greater than or equal to 0° and less than or equal to 5°.

A power tool includes a motor including a drive shaft rotating around a first axis; an output assembly including an output shaft centered around an output axis; and a work attachment driven by the output shaft to oscillate back and forth. According to different loads of the output shaft, the output assembly drives the work attachment to oscillate at different angles.

A power tool includes a motor including a drive shaft rotating around a first axis; an output assembly including an output shaft centered around an output axis; and a work attachment driven by the output shaft to oscillate back and forth. The power tool further includes an adjustment assembly configured to adjust, according to a load of the output shaft, an angle of oscillation of the work attachment driven by the output shaft.

In some examples, the power tool further includes a transmission assembly configured to transmit power between the motor and the output assembly to drive the output shaft to oscillate back and forth, where the transmission assembly includes a first bearing for supporting the drive shaft, a shift fork for supporting the output shaft, a second bearing for driving the shift fork to oscillate back and forth, and an eccentric member including a central portion connected to the first bearing and an eccentric portion connected to the second bearing.

In some examples, when the angle of oscillation of the work attachment driven by the output shaft is adjusted, the second bearing drives the eccentric member to oscillate back and forth at a specified stroke around a second axis.

In some examples, the adjustment assembly includes a first biasing element, and the first biasing element supports the eccentric member and applies a biasing force to the eccentric member to bias the eccentric member towards the drive shaft.

A power tool includes a motor including a drive shaft rotating around a first axis; an output assembly including an output shaft centered around an output axis; a work attachment driven by the output shaft to oscillate back and forth; a transmission assembly configured to transmit power between the motor and the output assembly to drive the output shaft to oscillate back and forth, where the transmission assembly is configured with different working modes, and when the transmission assembly is in the different working modes, the output shaft drives the work attachment to oscillate back and forth at different angles; and an operating assembly configured to control the motor and drive the transmission assembly to switch between multiple working modes.

In some examples, the power tool further includes a housing provided with an accommodation cavity, the motor is at least partially disposed in the accommodation cavity, and the operating assembly includes a trigger portion disposed outside the housing to be operated and a connecting portion connected to the transmission assembly, where the trigger portion is formed on or connected to the connecting portion, and the trigger portion is operated to drive the connecting portion so that the transmission assembly switches between the working modes.

In some examples, the connecting portion is connected to a driver circuit for the motor, and the trigger portion is operated to drive the connecting portion to start or stop the motor.

In some examples, the operating assembly includes multiple preset positions that can stop the trigger portion, and the multiple preset positions correspond to the working modes of the transmission assembly and working states of the motor.

In some examples, the power tool further includes a controller, and the controller adjusts an output rotational speed of the motor according to a preset position of the operating assembly.

In some examples, the power tool further includes a controller, and the connecting portion is connected to the controller. When the trigger portion is operated to drive the connecting portion so that the transmission assembly switches between the working modes, the connecting portion adjusts a rotational speed of the motor through the controller.

In some examples, the transmission assembly includes a first bearing for supporting the drive shaft, a shift fork for supporting the output shaft, a second bearing for driving the shift fork to oscillate back and forth, and an eccentric member including a central portion connected to the first bearing and an eccentric portion connected to the second bearing, where an axis of the eccentric portion is eccentric relative to an axis of the central portion.

In some examples, the second bearing is slidably connected to the eccentric portion along the axis of the eccentric portion, and the operating assembly drives the second bearing to slide back and forth relative to the output shaft along the axis of the eccentric portion at a specified stroke.

In some examples, the shift fork includes a first support portion connected to the second bearing, the first support portion extends along the first axis, and when the transmission assembly switches between the working modes, the second bearing is driven to mate with different positions of the first support portion.

In some examples, the connecting portion is connected to the second bearing.

DETAILED DESCRIPTION

The present application is described below in detail in conjunction with drawings and examples.

In the description of the present application, terms "joined", "connected", and "fixed" are to be understood in a broad sense unless otherwise expressly specified and limited. For example, the term "connected" may refer to "fixedly connected", "detachably connected", or "integrated", may refer to "mechanically connected" or "electrically connected", or may refer to "connected directly", "connected indirectly through an intermediary", or "connected inside two components" or an interaction relation between two components. For those of ordinary skill in the art, specific meanings of the preceding terms in the present application may be understood based on specific situations.

In the present application, unless otherwise expressly specified and limited, when a first feature is described as "on" or "under" a second feature, the first feature and the second feature may be in direct contact or may be in indirect contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

Figure 1:
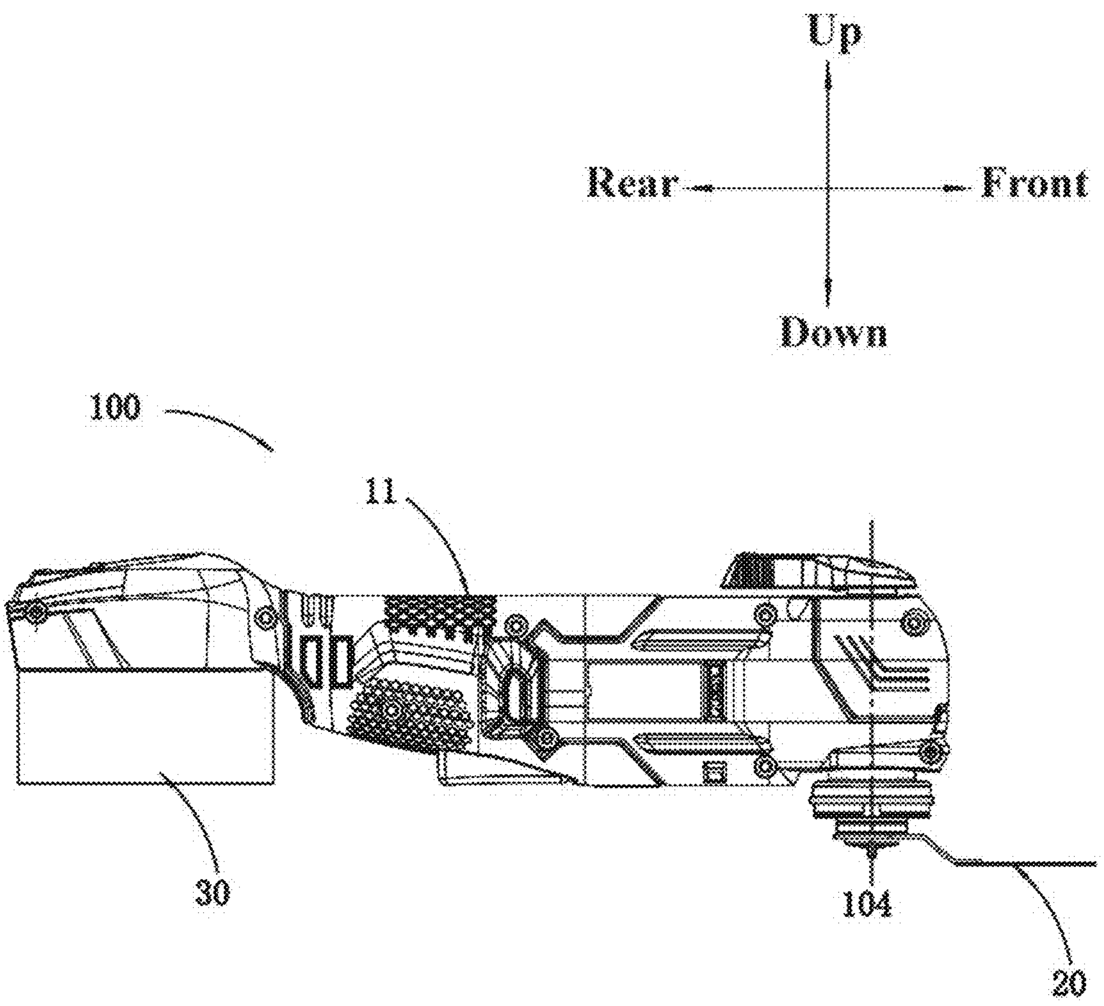
FIG. 1 is a structural view of a first example of the present application.
Figure 2:
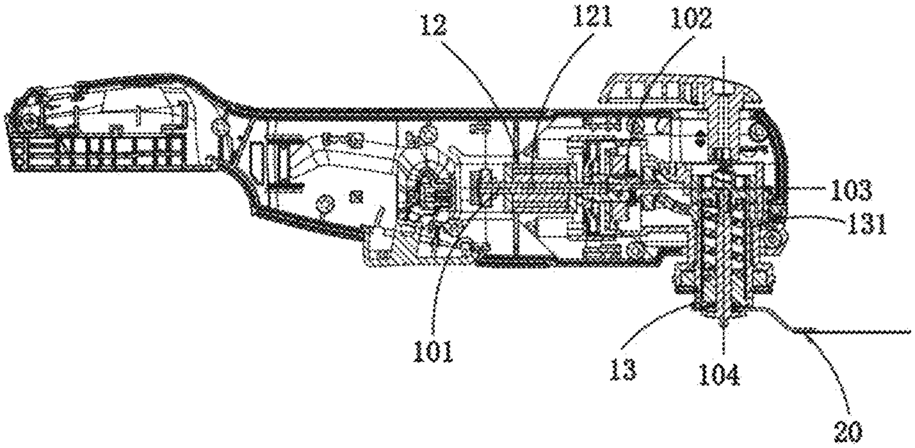
FIG. 2 is a sectional view of the first example of FIG. 1.

To clearly illustrate the technical solutions of the present application, an upper side, a lower side, a front side, and a rear side are defined, as shown in FIG. 1.

FIGS. 1 to 7 show a power tool of a first example of the present application. The power tool is a multi-tool 100 and an oscillating tool. In other alternative examples, the oscillating tool may be mounted with different work attachments 20, such as a triangle sander, a scraper, a metal saw blade, a woodworking saw blade, and a diamond saw blade. These different work attachments 20 enable the power tool 100 to implement functions such as sawing, sanding, rasping, and shoveling.

FIG. 1 shows the multi-tool 100 according to an example of the present application. The multi-tool 100 includes a power supply device 30. The power supply device 30 is configured to supply electrical energy to the multi-tool 100. In this example, the power supply device 30 is a battery pack, and the battery pack cooperates with a corresponding power supply circuit to power corresponding components in the multi-tool 100. For example, the battery pack may be a lithium battery pack, a solid-state battery pack, or a pouch battery pack. In some examples, the nominal voltage of the battery pack is 10.8 V, 24 V, 36 V, 48 V, 56 V, or 80 V.

It is to be understood by those skilled in the art that the power supply device 30 is not limited to the battery pack and may power the corresponding components in the machine through mains electricity or an alternating current power supply in cooperation with the corresponding rectifier, filter, and voltage regulation circuits.

As shown in FIGS. 1 to 7, the multi-tool 100 includes a housing 11, a motor 12, an output assembly 13, and a transmission assembly 14. The housing 11 includes a motor housing for accommodating the motor 12, a transmission housing for accommodating at least part of the transmission assembly 14, and an output housing for accommodating at least part of the output assembly 13. The motor 12 includes a drive shaft 121 rotatable around a first axis 101. The output assembly 13 includes an output shaft 131 for connecting the work attachment 20 and driving the work attachment 20 to oscillate. In this example, the motor is specifically an electric motor, and the electric motor 12 is used below instead of the motor, which is not to limit the present application.

In this example, the work attachment 20 is a cutting saw blade. In some examples, the work attachment 20 is one or more of a slotted saw blade with saw teeth at the front end, a cutting saw blade with saw teeth on a side, a sanding disc with a sanding surface, a cutting disc, a grinding disc, and a cutting knife.

The transmission assembly 14 connects the electric motor 12 to the output shaft 131 and transmits power from the electric motor 12 to the output shaft 131. Meanwhile, the transmission assembly 14 converts a rotational motion output by the drive shaft 121 into the rotation and oscillation of the output shaft 131. In this example, the transmission assembly 14 transmits the rotation of the electric motor 12 to the output shaft 131 so that the output shaft 131 rotates around an output axis 104 and drives the work attachment 20 to oscillate back and forth. In this example, the output axis 104 is perpendicular to the first axis 101.

Figure 3:
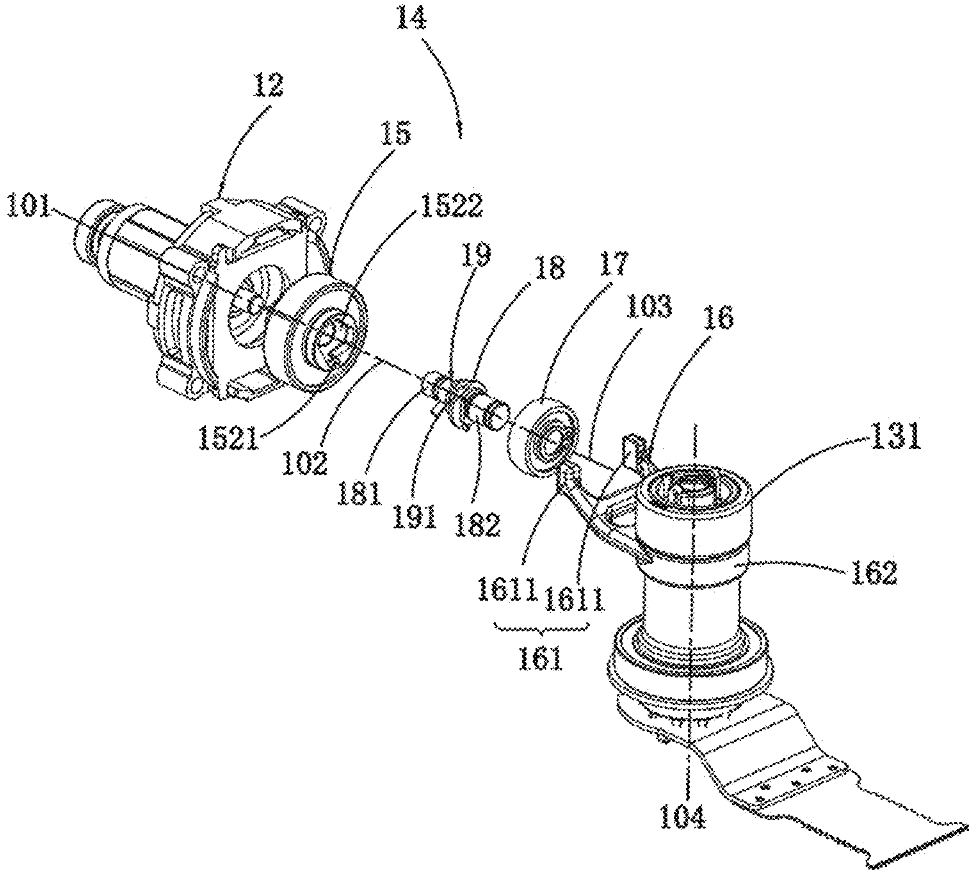
FIG. 3 is an exploded view of the first example of FIG. 1 with a housing removed.
Figure 4:
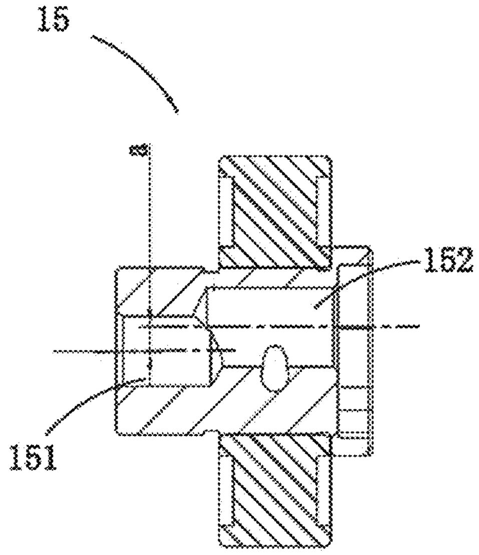
FIG. 4 is a sectional view of a first bearing.
Figure 5:
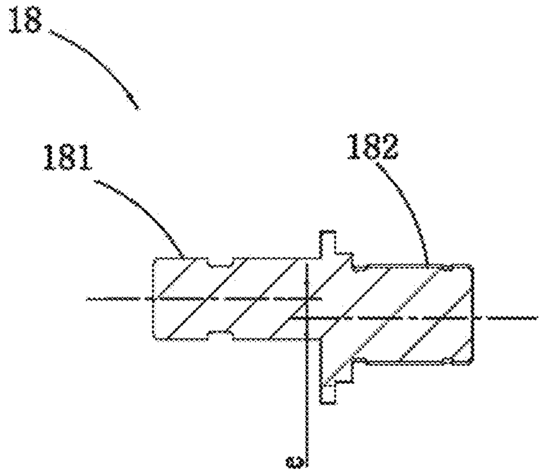
FIG. 5 is a sectional view of an eccentric member.

As shown in FIGS. 3 to 5, the transmission assembly 14 includes a first bearing 15, a shift fork 16, a second bearing 17, and an eccentric member 18. The first bearing 15 is configured to support the drive shaft 121. The shift fork 16 is configured to support the output shaft 131. The second bearing 17 is configured to drive the shift fork 16 to oscillate back and forth. The eccentric member 18 includes a central portion 181 connected to the first bearing 15 and an eccentric portion 182 connected to the second bearing 17. An axis of the eccentric portion 182 is eccentric relative to an axis of the central portion 181. The axis of the central portion 181 is a second axis 102, and the axis of the eccentric portion 182 is a third axis 103. In this example, the eccentric distance between the second axis 102 and the third axis 103 is e.

The shift fork 16 includes a first support portion 161 connected to the second bearing 17 and a second support portion 162 connected to the output shaft 131. In this example, the first support portion 161 is in contact with the second bearing 17 and driven by the second bearing 17 to oscillate back and forth. The first support portion 161 includes two swing claws 1611 disposed on the left and right sides of the second bearing 17. When the second bearing 17 is driven to rotate by the drive shaft 121, due to the eccentric structure of the eccentric member 18, the second bearing 17 impacts on the two swing claws 1611 by turns in a left and right direction. The second support portion 162 is fixedly connected to the output shaft 131, and a whole formed by the second support portion 162 and the output shaft 131 can oscillate around the output axis 104 within a range of an angle of oscillation. When the two swing claws 1611 are impacted by the second bearing 17, the shift fork 16 oscillates around the output axis 104 so that the shift fork 16 drives the output shaft 131 to oscillate within the angle of the angle of oscillation.

The multi-tool 100 further includes an adjustment assembly 19. The adjustment assembly 19 is configured to adjust the transmission assembly. The adjustment assembly 19 is configured to, when a load of the output shaft 131 satisfies a preset value of the adjustment assembly 19, control the transmission assembly 14 to adjust the output shaft 131 to drive the work attachment 20 to oscillate back and forth at a corresponding angle. The adjustment assembly 19 switches a working mode of the transmission assembly 14 according to the load of the output shaft 131. In this example, a predetermined value is set for the adjustment assembly 19. The predetermined value here is related to a load value of the output shaft 131. When the electric motor 12 rotates in a first rotation direction, that is, the electric motor rotates forward, the transmission assembly 14 starts to switch between different working modes when the load value of the output shaft 131 reaches the predetermined value. The transmission assembly 14 of the multi-tool 100 includes different working modes corresponding to different output angles of oscillation, thereby adapting to more working conditions. For example, when the hardness of a workpiece such as a wood material is relatively low, the output shaft 131 outputs a relatively small angle of oscillation, which is commonly used. When the hardness of the workpiece such as the wood material is relatively high, wood chips are not easy to discharge at a relatively small angle of oscillation, and thus the work attachment 20 such as the saw blade is easily stuck. Therefore, the output shaft 131 is required to output a relatively large angle of oscillation. When the saw blade is stuck or the oscillation is blocked, the output shaft 131 is subjected to a reverse force. At this time, the load of the output shaft 131 becomes larger. The corresponding preset value is set for the adjustment assembly 19 according to the load of the output shaft 131. When the load of the output shaft 131 exceeds the preset value, the angle of oscillation of the work attachment driven by the output shaft

131 is automatically adjusted, and the transmission assembly 14 can switch the working mode and then adjust the output angle of oscillation. In this manner, users have no need to switch the working mode by themselves, and the multi-tool can adaptively adjust the output angle of oscillation and is convenient for the users to operate.

The axis of the eccentric portion 182, the third axis 103, has at least two different eccentric distances from the axis of the drive shaft 121, the first axis 101 so that the output shaft 131 drives the work attachment 20 to oscillate back and forth at different angles of oscillation. Since the shift fork 16 is driven by the second bearing 17 to oscillate back and forth around the output axis 104, the angle of oscillation of the shift fork 16 is affected by the eccentric distance of the axis of the second bearing 17 relative to the axis of the drive shaft 121 and is proportional to the value of the eccentric distance. When the second bearing 17 changes between two different eccentric distances relative to the drive shaft 121, the shift fork 16 can drive the output shaft 131 to output two different angles of oscillation.

In this example, the first bearing 15 includes a central hole 151 connected to the drive shaft 121 and a first eccentric hole 152 with an eccentric distance from the central hole 151. The central portion 181 of the eccentric member 18 is connected to the first eccentric hole 152. An axis of the central hole 151 coincides with the axis of the drive shaft 121, that is, the axis of the central hole 151 is the first axis 101. In other alternative examples, the axis of the central hole 151 may be parallel to but does not coincide with the drive shaft 121. An axis of the first eccentric hole 152 coincides with the axis of the central portion 181 of the eccentric member 18, that is, the axis of the first eccentric hole 152 is the second axis 102. In other alternative examples, the axis of the first eccentric hole 152 is parallel to but does not coincide with the axis of the central portion 181 of the eccentric member 18.

Figure 6:
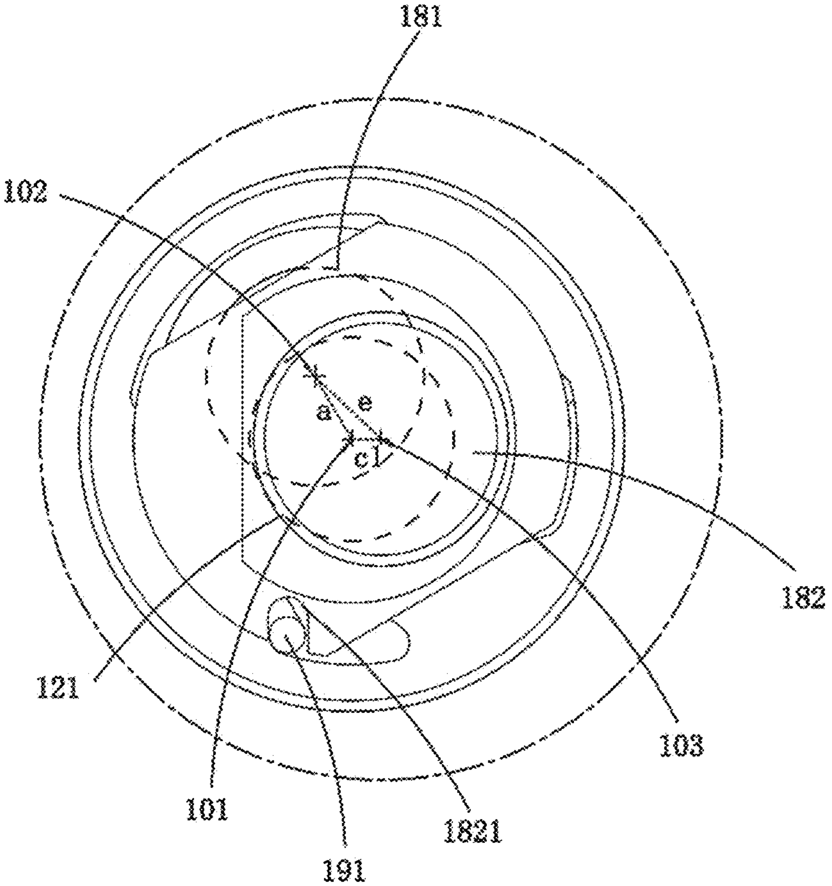
FIG. 6 is a partial enlarged view when a transmission assembly is in a first working mode in the first example of FIG. 1.
Figure 7:
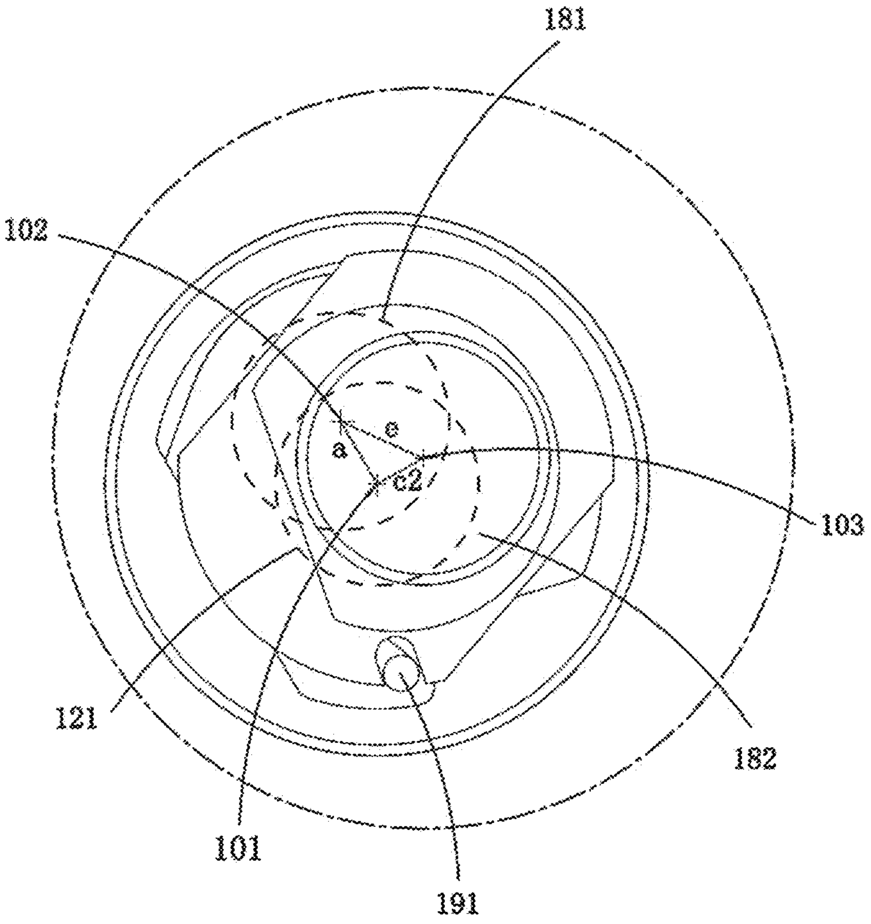
FIG. 7 is a partial enlarged view when a transmission assembly is in a second working mode in the first example of FIG. 1.

As shown in FIGS. 6 and 7, the same vertical plane is set so that the first axis 101, the second axis 102, and the third axis 103 are all projected onto the vertical plane. The eccentric distance between the first axis 101 and the second axis 102 is a. Since this eccentric distance is the distance between the axis of the central hole 151 and the axis of the first eccentric hole 152 of the first bearing 15, a is constant in size. The eccentric distance between the second axis 102 and the third axis 103 is e. Since this eccentric distance is the distance between the axis of the central portion 181 and the axis of the eccentric portion 182 of the eccentric member 18, e is constant in size. The eccentric distance between the first axis 101 and the third axis 103 is c. Since this eccentric distance is the distance between the axis of the central hole 151 of the first bearing 15 and the axis of the eccentric portion 182, c is variable in size. In the vertical plane, three points corresponding to the three straight lines form a triangle. According to the formulas of trigonometric functions, as the angle between the eccentric distance a and the eccentric distance e increases, the eccentric distance c increases. Therefore, the second bearing 17 drives the eccentric member 18 to oscillate back and forth at a specified stroke around the second axis 102, and the third axis 103 rotates around the second axis 102 so that c changes in size.

In this example, the transmission assembly 14 is configured with different working modes. When the transmission assembly 14 is in the different working modes, the output shaft 131 drives the work attachment 20 to oscillate back and forth at different angles. For convenience of description, in this example, when the output shaft 131 drives the work attachment 20 to oscillate back and forth at a first angle, it is set that the transmission assembly 14 is in a first working mode. When the output shaft 131 drives the work attachment 20 to oscillate back and forth at a second angle, it is set that the transmission assembly 14 is in a second working mode.

As shown in FIG. 6, the transmission assembly 14 is in the first working mode, and the eccentric distance between the first axis 101 and the third axis 103 is c1. As shown in FIG. 7, the transmission assembly 14 is in the second working mode, and the eccentric distance between the first axis 101 and the third axis 103 is c2, where c1 is smaller than c2.

In this example, the adjustment assembly 19 includes a first biasing element 191. The first biasing element 191 applies a biasing force for approaching the drive shaft 121 to the eccentric member 18 to bias the eccentric member 18 towards the drive shaft 121. When the eccentric member 18 drives the shift fork 16 to move, the eccentric member 18 is subjected to a reaction force which causes the eccentric member 18 to apply first pressure for moving away from the drive shaft 121 to the first biasing element 191. When the first pressure is less than or equal to the biasing force, the transmission assembly 14 is in the first working mode, that is, a small angle of oscillation is output. When the first pressure is greater than the biasing force, the transmission assembly 14 starts to switch from the first working mode to the second working mode, and the eccentric member 18 is driven by the shift fork 16 and the second bearing 17 to start rotating around the second axis 102. In this example, the eccentric member rotates clockwise. The first biasing element 191 is biased so that the biasing force increases. When the first pressure is equal to the biasing force, the eccentric member 18 stops rotating around the second axis 102 and remains at the current position. At this time, the eccentric distance between the first axis 101 and the third axis 103 may be between c1 and c2, or the eccentric distance between the first axis 101 and the third axis 103 may be c2. After the eccentric member 18 rotates to a position such that the transmission assembly 14 is in the second working mode, the eccentric member 18 stops rotating. When the transmission assembly 14 is in the second working mode, if the first pressure is less than the biasing force, the first biasing element 191 drives the eccentric member 18 to start rotating in an opposite direction around the second axis 102. In this example, the eccentric member rotates counterclockwise. After the eccentric member 18 is reset to a position such that the transmission assembly 14 is in the first working mode, the eccentric member 18 stops rotating. According to a relationship between a value of the reverse force of the output shaft 131 and the predetermined value, the adjustment assembly 19 selectively limits a process of the transmission assembly 14 switching between the first working mode and the second working mode, so as to ensure that the working mode matches the working condition and that the work attachment 20 and the electric motor 12 can be protected.

In this example, the first biasing element 191 is a torsion spring sleeved between the eccentric portion 182 and the first eccentric hole 152. In other examples, the first biasing element may be another form of spring or a resettable elastic element. A first limiting portion 1521 is provided on the first eccentric hole 152, and a second limiting portion 1821 is provided on the eccentric portion 182. A first groove 1522 is further provided on the first eccentric hole 152, the torsion spring is mounted in the first groove 1522, and an end of the torsion spring abuts against or is fixedly connected to the first groove 1522. A second end of the torsion spring is fixed in the second limiting portion 1821. When the transmission assembly 14 is in the first working mode, the second end of the torsion spring abuts against a first wall of the first limiting portion 1521. When the transmission assembly 14 is in the second working mode, the second end of the torsion spring abuts against a second wall of the first limiting portion 1521. The first limiting portion 1521 and the second limiting portion 1821 limit a stroke of oscillation of the eccentric member 18 around the second axis 102.

A third limiting portion is provided between the first bearing 15 and the eccentric member 18 to limit an axial displacement of the eccentric member 18. In this example, a limiting hole is provided on the central hole 151 in a direction perpendicular to the first axis 101. A limiting groove mating with the limiting hole is provided in a circumferential direction on the central portion of the eccentric member 18. A limiting pin is disposed across the limiting hole and the limiting groove so that the limiting pin limits the axial displacement of the eccentric member 18 without affecting the axial rotation of the eccentric member 18.

Figure 8:
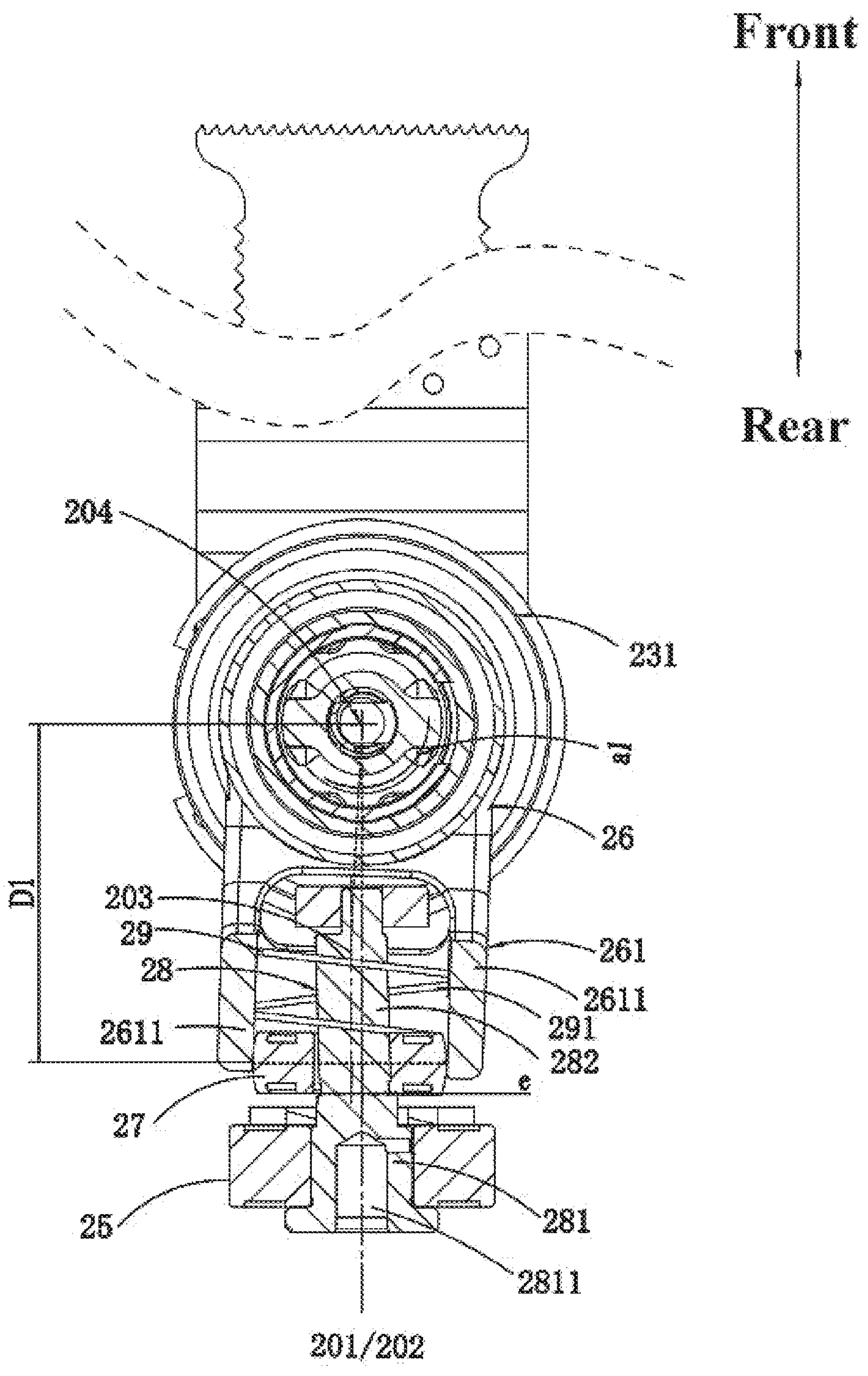
FIG. 8 is a schematic view when a transmission assembly is in a first working mode in a second example of the present application.
Figure 9:
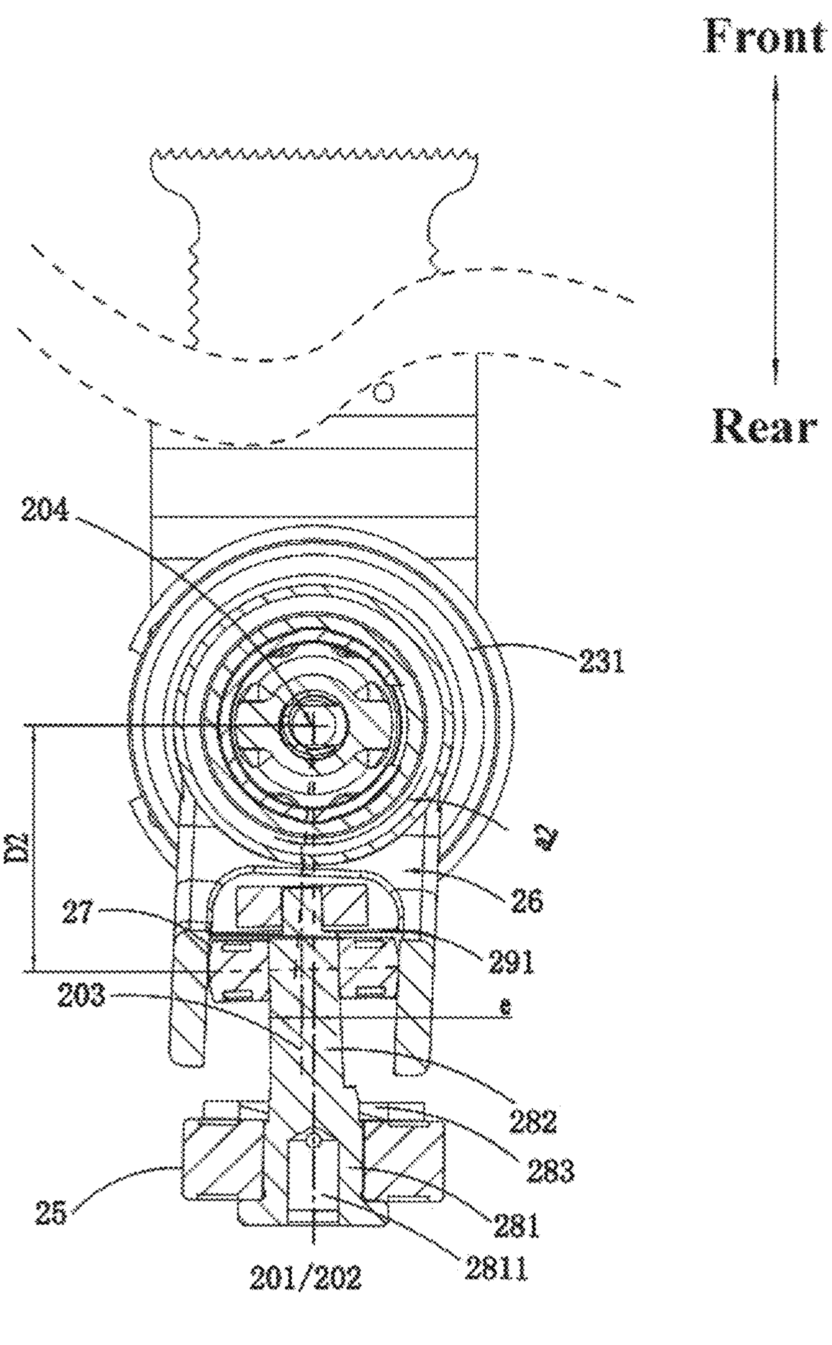
FIG. 9 is a schematic view when a transmission assembly is in a second working mode in a second example of the present application.

FIGS. 8 and 9 show a power tool of another example of the present application. The power tool differs from the first example in that a transmission assembly has a different structure for achieving different angles of oscillation. Components the same as those in the first example continue to use the reference numerals in the first example.

As shown in FIGS. 8 and 9, in this example, when the eccentric distance e between an axis of an eccentric portion, a third axis 203, and an axis of a motor shaft, a first axis 201, is constant, a position of a shift fork 26 mating with a second bearing 27 is adjusted, that is, the distance between the second bearing 27 and an output shaft 231 is changed so that different angles of oscillation are output.

In this example, a first bearing 25 includes a central hole for connecting the motor shaft. An eccentric member 28 includes a central portion 281 connected to the first bearing 25 and the eccentric portion 282 connected to the second bearing 27. The axis of the eccentric portion 282 is eccentric relative to an axis of the central portion 281. The axis of the central portion 281 is a second axis 202. The axis of the eccentric portion 282 is the third axis 203. The central portion 281 of the eccentric member 28 is connected to the central hole. An accommodation hole 2811 coaxial with the central portion 281 is provided at the center of the central portion 281 of the eccentric member 28. The central portion 281 is inserted into the central hole, and a drive shaft (not shown in the figures) is inserted into the accommodation hole 2811. In this example, after installation, the first axis 201 coincides with the second axis 202. The second axis 202 is parallel to the third axis 203 and the eccentric distance between the second axis 202 and the third axis 203 is e.

The second bearing 27 is slidably connected to the eccentric portion 282 along the axis of the eccentric portion 282, the third axis 203. When the transmission assembly switches between a first working mode and a second working mode, the second bearing 27 slides back and forth relative to the output shaft along the axis of the eccentric portion 282 at a specified stroke.

The shift fork 26 includes a first support portion 261 connected to the second bearing 27 and a second support portion connected to the output shaft 231. In this example, the first support portion 261 is in contact with the second bearing 27 and driven by the second bearing 27 to oscillate back and forth. The first support portion 261 includes two swing claws 2611 disposed on the left and right sides of the second bearing 27. The second bearing 27 is a ball bearing. The second bearing 27 has an outer ring and an inner ring, where the outer ring has a spherical outer surface, and the inner ring is sleeved on the eccentric portion 282. The swing claw has a substantially planar inner sidewall, and the inner sidewall is slidably in close contact with the outer surface of the outer ring.

The shift fork 26 mates with the second bearing 27 so that the transmission assembly can switch between different working modes. In the different working modes, the output shaft 231 can output different angles of oscillation a. As shown in FIG. 8, the transmission assembly is in the first working mode, the second bearing 27 mates with the rear end of the first support portion 261 of the shift fork 26, and the horizontal distance between the center line of the second bearing 27 and an output axis 204 is D1. In this case, the output shaft 231 has an angle of oscillation a1. As shown in FIG. 9, the transmission assembly is in the second working mode, the center line of the second bearing 27 mates with the front end of the first support portion 261 of the shift fork 26, and the horizontal distance between the second bearing 27 and the output axis 204 is D2. In this case, the output shaft 231 has an angle of oscillation a2. Apparently, when the transmission assembly moves from the first working mode to the second working mode, the horizontal distance between the second bearing 27 and the output axis 204 gradually decreases from D1 to D2, and accordingly, the angle of oscillation of the output shaft 231 gradually increases from a1 to a2.

In this example, an adjustment assembly 29 includes a biasing element 291. The biasing element 291 applies a biasing force for moving away from the drive shaft to the second bearing 27 to bias the second bearing 27 away from the drive shaft 121. When the second bearing 27 drives the shift fork to move, the second bearing 27 is subjected to a reaction force which causes the second bearing 27 to apply pressure for approaching the drive shaft to the biasing element 291. When the pressure is less than or equal to the biasing force, the transmission assembly is in the first working mode, that is, a small angle of oscillation is output. When the pressure is greater than the biasing force, the transmission assembly starts to switch from the first working mode to the second working mode. Then, the biasing element 291 is biased so that the biasing force increases. When the pressure is equal to the biasing force, the second bearing 27 stops sliding and remains at the current position. When the second bearing 27 slides to a position in the second working mode, the second bearing 27 stops moving. When the pressure is less than the biasing force, the biasing element 291 drives the second bearing 27 to start moving in an opposite direction. After the eccentric member is reset to a position such that the transmission assembly is in the first working mode, the second bearing 27 stops moving. According to a relationship between a value of a load of the output shaft 231 and a predetermined value, the adjustment assembly 29 selectively limits a process of the transmission assembly 14 switching between the first working mode and the second working mode, so as to ensure that the working mode matches the working condition and that a work attachment 20 and an electric motor 12 can be protected.

In this example, the biasing element 291 is a compression spring sleeved on the eccentric portion 282. In other examples, the biasing element may be another form of spring or a resettable elastic element.

As an alternative example of this example, an angle is set between the third axis and the first axis so that the moving distance of the second bearing is shortened when a range of the angle of oscillation output by the output shaft remains unchanged. In this example, the angle between the third axis and the first axis is greater than or equal to 0° and less than or equal to 5°. In some examples, the angle is greater than or equal to 0° and less than or equal to 3°. In some examples, the angle is greater than or equal to 1° and less than or equal to 3°. In some examples, the angle is 1.5°.

The transmission assembly further includes a counterbalance 283. The center of gravity of the counterbalance 283 and the center of gravity of the eccentric member 28 are located on two sides of the first axis 201.

Figure 10:
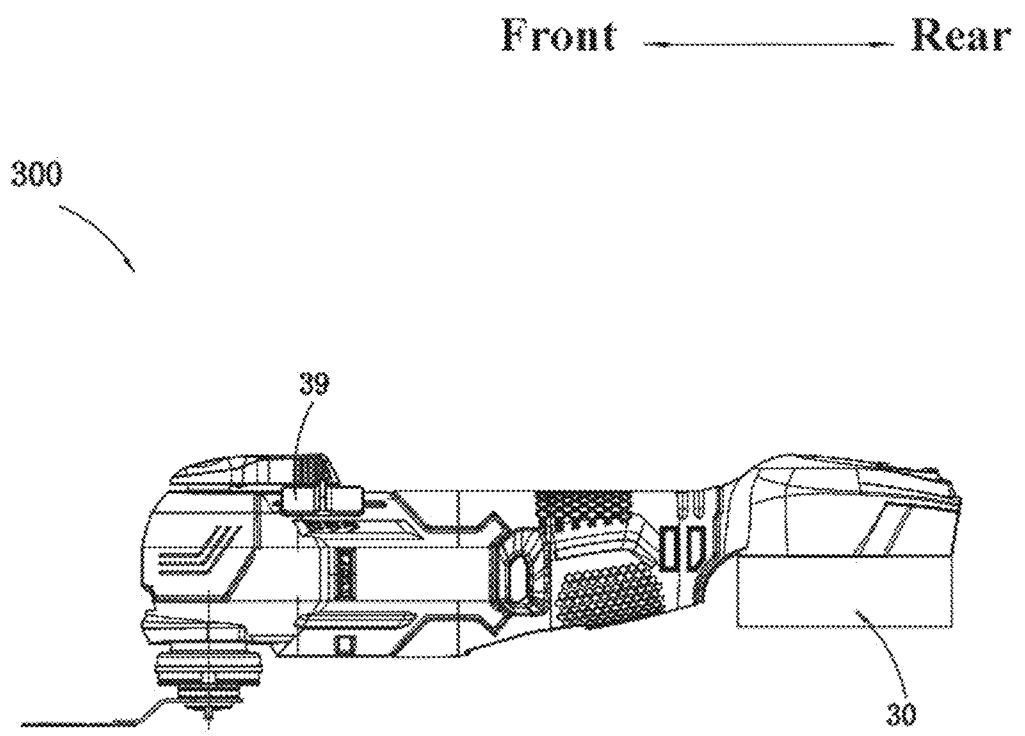
FIG. 10 is a structural view of a third example of the present application.
Figure 11:
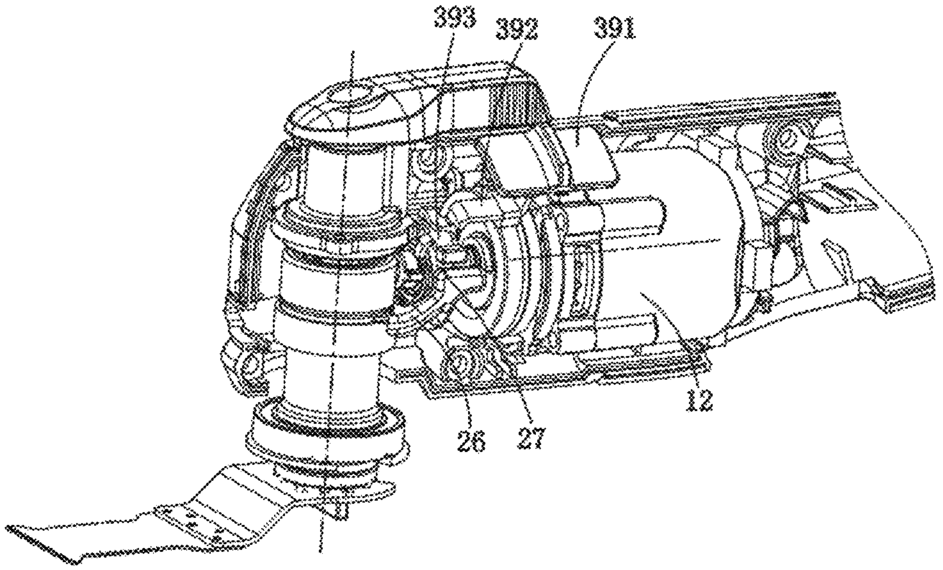
FIG. 11 is a view of the internal structure of a third example of the present application.

FIGS. 10 and 11 show a power tool of a third example of the present application. The power tool differs from the first example and the second example in that a different structure drives the transmission assembly to achieve different angles of oscillation.

A multi-tool 300 further includes an operating assembly 39. The operating assembly 39 is configured to control the start and stop of the electric motor and a running state of the electric motor and drive the transmission assembly to switch between the first working mode and the second working mode.

The operating assembly 39 includes a trigger portion 391 disposed outside the housing to be operated and a connecting portion 392 connected to the transmission assembly. The trigger portion 391 is formed on or connected to the connecting portion 392. The trigger portion 391 is operated to drive the connecting portion 392 so that the transmission assembly switches between the first working mode and the second working mode.

With the transmission assembly in the second example as an example, a ring sleeve 393 connected to the second bearing 27 is provided on a side of the connecting portion 392 facing the transmission assembly. In other alternative examples, the connecting portion 392 may be connected to the second bearing 27 or the eccentric portion through other structures as long as a user can drive the second bearing 27 to move by operating the trigger portion 391.

Figure 12:
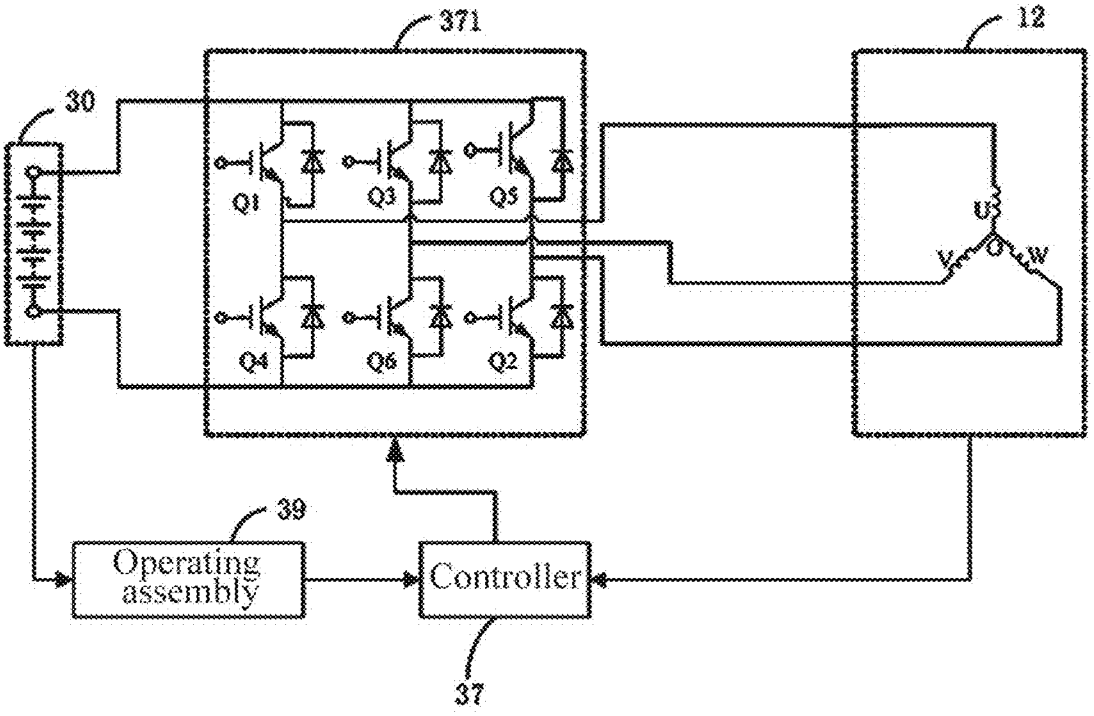
FIG. 12 is a circuit block diagram of an example of the present application.

As shown in FIG. 12, in this example, the electric motor 12 includes a stator and a rotor. In some examples, the electric motor 12 is a three-phase brushless motor and includes the rotor with a permanent magnet and three-phase stator windings U, V, and W electronically commutated. In some examples, the three-phase stator windings U, V, and W adopt a start connection. In some other examples, the three-phase stator windings U, V, and W adopt a delta connection. However, it is to be understood that other types of brushless motors are also within the scope of the present application. The brushless motor may include less than or more than three phases.

A control circuit of the power tool 300 includes a driver circuit 371 and a controller 37. The driver circuit 371 is electrically connected to the stator windings U, V, and W of the electric motor 12 and configured to transmit a current from the power supply device 30 to the stator windings U, V, and W to drive the electric motor 12 to rotate. In an example, the driver circuit 371 includes multiple switching elements Q1, Q2, Q3, Q4, Q5, and Q6. A gate terminal of each switching element is electrically connected to the controller and used for receiving a control signal from the controller. A drain or source of each switching element is connected to the stator winding U, V, or W of the electric motor 12. The switching elements Q1 to Q6 receive control signals from the controller to change respective conduction states, thereby changing the current loaded to the stator windings U, V, and W of the electric motor 12 by the power supply device 30. In an example, the driver circuit 371 may be a three-phase bridge driver circuit including six controllable semiconductor power devices (such as field-effect transistors (FETs), bipolar junction transistors (BJTs), or insulated-gate bipolar transistors (IGBTs)). In an example, the switching elements may be any other types of solid-state switches, such as the IGBTs or the BJTs.

The connecting portion 392 is also connected to the driver circuit 371 for the electric motor 12, including, but not limited to, a mechanical connection or an electrical connection. The trigger portion 391 is operated to drive the connecting portion 392 to start or stop the electric motor 12.

In this example, the operating assembly 39 and the housing include multiple limiting portions that can be selectively locked, including, but not limited to, snap fit, rod-slot fit, or hook-slot fit. The limiting portions are disposed so that the operating assembly 39 includes multiple preset positions that can stop an operating assembly, where the multiple preset positions correspond to the working modes of the transmission assembly and working states of the electric motor. In this example, the multiple preset positions may include an on/off position, a position for the first working mode, and a position for the second working mode.

The controller 37 adjusts an output rotational speed of the electric motor according to a preset position of the operating assembly 39.

As an alternative example, the connecting portion 392 is connected to the controller. When the trigger portion 391 is operated to drive the connecting portion 392 so that the transmission assembly switches between the first working mode and the second working mode, the connecting portion 392 adjusts the rotational speed of the electric motor through the controller.

The operating assembly 39 outputs different analog signals at different positions. When the operating assembly 39 is at the position for the first working mode or the position for the second working mode, the output analog signal is positively correlated to a duty cycle of a pulse-width modulation (PWM) signal of the electric motor 12, and the duty cycle of the PWM signal is positively correlated to the rotational speed of the electric motor 12.

In some examples, the power tool 300 stores a mapping relationship between the position of the operating assembly 39 and the PWM signal, where the mapping relationship may be linear or non-linear, which is not limited in the examples of the present application.

As an alternative example, the operating assembly 39 includes the connecting portion 392 connected to the transmission assembly and a second electric motor for driving the connecting portion 392, the second electric motor corresponds to a second control circuit, and the connecting portion 392 is formed on or connected to a second motor shaft of the second electric motor.

The operating assembly further includes the trigger portion 391 disposed outside the housing to be operated, and the trigger portion 391 is configured to input a control signal to the second electric motor. In this example, the trigger portion 391 is a trigger switch.

The second electric motor is connected to the electric motor. According to the working state of the electric motor, the second electric motor drives the connecting portion 392 to move so that the transmission assembly switches between the first working mode and the second working mode. Specifically, the second electric motor detects or identifies the output rotational speed of the electric motor through a sensor and matches different working modes according to different output rotational speeds of the electric motor.

The second electric motor is connected to an output shaft 331. When the output shaft 331 is subjected to a reverse force, the second electric motor drives, according to a magnitude of the reverse force of the output shaft 331, the connecting portion 392 to move so that the transmission assembly switches between the first working mode and the second working mode.

What is claimed is:

1. A power tool, comprising:

a motor comprising a drive shaft rotating around a first axis;

an output assembly comprising an output shaft centered around an output axis;

a work attachment driven by the output shaft to oscillate back and forth;

a transmission assembly configured to transmit power between the motor and the output assembly to drive the output shaft to oscillate back and forth, the transmission assembly comprising a first bearing for supporting the drive shaft, a shift fork for supporting the output shaft, a second bearing for driving the shift fork to oscillate, and an eccentric member comprising a central portion connected to the first bearing and an eccentric portion connected to the second bearing; and an adjustment assembly for adjusting the transmission assembly wherein the adjustment assembly is configured to, when a load of the output shaft satisfies a preset value of the adjustment assembly, control the transmission assembly according to the load of the output shaft so that the transmission assembly adjusts an angle of oscillation of the work attachment, wherein the first bearing comprises a central hole connected to the drive shaft and a first eccentric hole with an eccentric distance from the central hole, a center line of the first eccentric hole is a second axis, and the central portion of the eccentric member is connected to the first eccentric hole.

2. The power tool according to claim 1, wherein an axis of the eccentric portion is eccentric relative to an axis of the central portion.

3. The power tool according to claim 2, wherein the transmission assembly is configured with different working modes, and, when the transmission assembly is in the different working modes, the output shaft drives the work attachment to oscillate back and forth at different angles.

4. The power tool according to claim 3, wherein, when the transmission assembly switches between the different working modes, the axis of the eccentric portion has different eccentric distances from the first axis.

5. The power tool according to claim 3, wherein, when the transmission assembly switches between the different working modes, the second bearing drives the eccentric member to oscillate back and forth at a specified stroke around the second axis.

6. The power tool according to claim 3, wherein the adjustment assembly comprises a first biasing element, and the first biasing element supports the eccentric member and applies a biasing force to the eccentric member to bias the eccentric member towards the drive shaft.

7. The power tool according to claim 6, wherein, when the output shaft is subjected to the load, the eccentric member applies first pressure for moving away from the drive shaft to the first biasing element.

8. The power tool according to claim 7, wherein, when the first pressure is greater than the biasing force, the eccentric member moves away from the drive shaft.

9. The power tool according to claim 1, wherein the second bearing is slidably connected to the eccentric portion along an axis of the eccentric portion, and the second bearing slides back and forth relative to the output shaft along the axis of the eccentric portion at a specified stroke.

10. The power tool according to claim 9, wherein the axis of the eccentric portion has a constant eccentric distance from the first axis.

11. The power tool according to claim 9, wherein the shift fork comprises a first support portion connected to the second bearing, and the first support portion extends along the first axis.

12. The power tool according to claim 11, wherein, when the transmission assembly adjusts the angle of oscillation of the work attachment, the second bearing is driven to mate with different positions of the first support portion.

13. The power tool according to claim 1, wherein an angle is set between an axis of the eccentric portion and the first axis, and the angle is greater than or equal to 0° and less than or equal to 5°.

14. A power tool, comprising:

a motor comprising a drive shaft rotating around a first axis;

an output assembly comprising an output shaft centered around an output axis;

a work attachment driven by the output shaft to oscillate back and forth;

an adjustment assembly configured to adjust, according to a load of the output shaft, an angle of oscillation of the work attachment driven by the output shaft; and a transmission assembly configured to transmit power between the motor and the output assembly to drive the output shaft to oscillate back and forth, wherein the transmission assembly comprises a first bearing for supporting the drive shaft, a shift fork for supporting the output shaft, a second bearing for driving the shift fork to oscillate back and forth, and an eccentric member comprising a central portion connected to the first bearing and an eccentric portion connected to the second bearing, wherein the first bearing comprises a central hole connected to the drive shaft and a first eccentric hole with an eccentric distance from the central hole, a center line of the first eccentric hole is a second axis, and the central portion of the eccentric member is connected to the first eccentric hole.

15. The power tool according to claim 14, wherein, when the angle of oscillation of the work attachment driven by the output shaft is adjusted, the second bearing drives the eccentric member to oscillate back and forth at a specified stroke around the second axis.

16. The power tool according to claim 14, wherein the adjustment assembly comprises a first biasing element, and the first biasing element supports the eccentric member and applies a biasing force to the eccentric member to bias the eccentric member towards the drive shaft.

* * * * *